US008436849B2

(12) United States Patent
Jang et al.

(10) Patent No.: US 8,436,849 B2
(45) Date of Patent: May 7, 2013

(54) CIRCUIT DRIVING FOR LIQUID CRYSTAL DISPLAY DEVICE

(75) Inventors: Soo-Ho Jang, Miryoung-si (KR); Seok-Su Kim, Gumi-si (KR); Tae-Young Jung, Daegu (KR)

(73) Assignee: LG Display Co., Ltd., Seoul (KR)

(*) Notice: Subject to any disclaimer, the term of this patent is extended or adjusted under 35 U.S.C. 154(b) by 497 days.

(21) Appl. No.: 12/822,827

(22) Filed: Jun. 24, 2010

(65) Prior Publication Data

US 2011/0157148 A1 Jun. 30, 2011

(30) Foreign Application Priority Data

Dec. 30, 2009 (KR) ........................ 10-2009-0134539

(51) Int. Cl.
*G06F 3/038* (2006.01)

(52) U.S. Cl.
USPC ................................ 345/213; 345/94; 345/99

(58) Field of Classification Search ........................ None
See application file for complete search history.

(56) References Cited

U.S. PATENT DOCUMENTS

| | | | | |
|---|---|---|---|---|
| 7,764,262 | B2 * | 7/2010 | Lee | 345/99 |
| 8,106,873 | B2 * | 1/2012 | Cheng et al. | 345/99 |
| 8,325,175 | B2 * | 12/2012 | Hyun et al. | 345/212 |
| 2008/0001887 | A1 | 1/2008 | Hong et al. | |
| 2008/0315912 | A1 | 12/2008 | Satsukawa | |
| 2010/0123708 | A1 * | 5/2010 | Jang et al. | 345/213 |

FOREIGN PATENT DOCUMENTS

| | | | |
|---|---|---|---|
| CN | 101114414 | A | 1/2008 |
| JP | 2004-15992 | A | 1/2004 |

OTHER PUBLICATIONS

Office Action issued in corresponding Chinese Patent Application No. 201010509802.7, mailed Aug. 31, 2012.

* cited by examiner

*Primary Examiner* — Jason Olson
(74) *Attorney, Agent, or Firm* — Brinks Hofer Gilson & Lione

(57) ABSTRACT

The present invention relates to a circuit for driving a liquid crystal display device in which no multi-flicker preventive signal FLK, but only single flicker preventive signal FLK, is used for reducing numbers of pins of a timing controller and a level shifter. The circuit for driving a liquid crystal display device includes a liquid crystal panel having a plurality of pixel regions for displaying an image, a timing controller for generating one flicker preventive signal and a plurality of clock signals and gate control signals to control driving timing of a gate driver, a gate pulse modulation unit for logically operating the one flicker preventive signal and the plurality of clock signals from the timing controller to generate a plurality of flicker preventive signals, and modulating a gate high voltage from the timing controller according to each of the plurality of flicker preventive signals generated thus to generate a plurality of modulated gate on voltages; a level shifter unit for changing the plurality of clock signals from the timing controller according to the plurality of modulated gate on voltages from the gate pulse modulation unit and a gate low voltage from the timing controller to generate a plurality of level shifted and modulated clock signals; and a gate driver for driving gate lines on the liquid crystal panel according to the a plurality of level shifted and modulated clock signals.

3 Claims, 8 Drawing Sheets

CIRCUIT DRIVING FOR LIQUID CRYSTAL DISPLAY DEVICE

This application claims the benefit of the Patent Korean Application No. 10-2009-0134539, filed on Dec. 30, 2009, which is hereby incorporated by reference as if fully set forth herein.

BACKGROUND

1. Field of the Invention

The present disclosure relates to a technology for reducing flicker in generating a gate pulse modulating signal at the time of overlapping driving of a GIP (Gate in panel) panel, and more particularly, to a circuit for driving a liquid crystal display device in which no multi-flicker preventive signal FLK, but only single flicker preventive signal FLK, is used for reducing numbers of pins of a timing controller and a level shifter.

2. Discussion of the Related Art

A related art liquid crystal display device controls a light transmissivity of liquid crystals by using an electric field for displaying a picture. To do this, the liquid crystal display device is provided with a liquid crystal panel having a matrix of pixel regions and a driving circuit for driving the liquid crystal panel.

The liquid crystal panel has a plurality of gate lines and a plurality of data lines arranged perpendicular to each other. A pixel region is positioned at every region defined as the gate lines and the data lines cross each other perpendicularly. Pixel electrodes and a common electrode are formed on the liquid crystal panel for applying an electric field to the pixel regions.

Each of the pixel electrodes is connected to the data line through a thin film transistor TFT, which is a switching device. The thin film transistor has a gate electrode, a source electrode and a drain electrode. The thin film transistor is turned on in response to a scan pulse applied to the gate electrode via the gate line, and supplies a data signal on the data line to the pixel electrode.

The driving circuit has a gate driver for driving the gate lines, and a data driver for driving the data lines, a timing controller for supplying a control signal to control the gate driver and the data driver, and a power source unit for supplying various driving voltages for the liquid crystal display device.

The timing controller controls driving timings of the gate driver and the data driver, and supplies a pixel data signal to the data driver. The power supply unit receives a voltage and pulls up/down the voltage for generating driving voltages the liquid crystal display device requires, such as a common voltage VCOM, a gate high voltage signal VGH, a gate low voltage signal VGL, and so on. The gate driver supplies a scan pulse to the gate lines in succession for driving one line portion of liquid crystal cells on the liquid crystal panel in succession. The data driver supplies a pixel voltage to each of the data lines every time the scan pulse is supplied to one of the gate lines.

The liquid crystal display device accordingly individually controls the light transmissivity of the liquid crystal cells by the electric field applied between the pixel electrode and the common electrode according to the pixel voltage, thereby displaying the picture.

In this instance, as described, the gate driver is provided with a shift register for forwarding the scan pulses in succession. There is a recent trend in widely using a GIP (Gate In Panel) technology, in which the gate driver is formed in the panel.

The liquid crystal display device has a problem in that a picture quality thereof becomes poor due to flickers caused both by differences of variation of positive and negative pixel voltages charged at the pixels with variation of parasitic capacitance in the thin film transistor and the gate voltage at the time the thin film transistor is turned off, and the increased load (resistance and capacitance) on the gate line come from an increased size of the liquid crystal display device which increases delay of the scan pulse that results in shortage of time for the thin film transistor to charge a data.

Consequently, in order to solve the problem, GPM (Gate Pulse Modulation) is used, which is operated in synchronization with at least two clock signals (2-phase non-overlapping clock) having portions overlapped with each other.

FIG. 1 illustrates a block diagram of a related art gate pulse modulation signal generating circuit.

Referring to FIG. 1, the related art gate pulse modulation signal generating circuit is provided with gate pulse modulation units 41A and 41B for receiving flicker preventive signals FLK1 and FLK2 and generating gate-on voltage modulation signals VGHM1 and VGHM2 respectively, level shifters 42A and 42B for receiving clock signals (ICLK1 and ICLK3), and (ICLK2 and ICLK4) from the timing controller and generating 2H interval, VGL~VGH level modulated odd and even line clock signals (CLK1 and CLK3), and (CLK2 and CLK4) respectively, and a GIP 43 for receiving the clock signals (CLK1 and CLK3), and (CLK2 and CLK4) from the level shifters 42A and 42B and generating and forwarding modulated gate output signals (GATE OUTPUT N−1), (GATE OUTPUT N), (GATE OUTPUT N+1) to the gate lines of the liquid crystal panel. The GIP 43 is a built-in type gate output circuit. That is, the GIP 43 is formed in the liquid crystal panel while rest of element is formed on an outside of the liquid crystal panel.

The operation of the related art gate pulse modulation signal generating circuit will be described.

FIGS. 2A~2G illustrate waveforms for showing generating steps of a gate pulse modulation signal in a related art overlapping drive, FIGS. 3A~3D illustrate waveforms of related art clock signals respectively, and FIGS. 3E~3H illustrate waveforms of related art level shifted and modulated clock signals respectively.

The gate pulse modulation unit 41A receives a flicker preventive signal FLK1 as shown in FIG. 2A and the gate high voltage VGH from the timing controller and generates a gate-on voltage modulation signal VGHM1 as shown in FIG. 2B. The gate high voltage VGH is a high logic voltage of the scan pulse set higher than a threshold voltage of the TFT.

Alikely, the gate pulse modulation unit 41B receives a flicker preventive signal FLK2 as shown in FIG. 2C and the gate high voltage VGH from the timing controller and generates a gate-on voltage modulation signal VGHM2 as shown in FIG. 2D.

The level shifter 42A receives the gate-on voltage modulation signal VGHM1 from the gate pulse modulation unit 41A, the clock signals (ICLK1 and (CLK3) as shown in FIGS. 3A and 3C from the timing controller (not shown) and generates a level shifted and modulated odd line clock signal (CLK1 and CLK3) as shown in FIGS. 3E and 3G. The gate low voltage VGL is a low logic voltage of the scan pulse set as a turn-off voltage of the TFT.

The level shifter 42B receives the gate-on voltage modulation signal VGHM2 from the gate pulse modulation unit 41B, the clock signals (ICLK2 and (CLK4) as shown in FIGS. 3B and 3D from the timing controller and generates a level shifted and modulated even line clock signal (CLK2 and CLK4) as shown in FIGS. 3F and 3H.

The GIP 43 which is a gate driver IC built-in the panel receives the four phase clock signals CLK1, CLK2, CLK3 and CLK4 from the level shifters 42A and 42B and the VGH and VGL voltages and generates and forwards modulated gate output signals (GATE OUTPUT N−1), (GATE OUTPUT N) and (GATE OUTPUT N+1) as shown in FIGS. 2E, 2F and 2G to the gate lines of the liquid crystal panel.

If the overlapping driving is used as the gate driving, since the gate output signal has 2H intervals, the gate modulation signal can not be forwarded to a (2n)th (even numbered) line and a (2n+1)th (odd numbered) line by using one clock signal FLK. Therefore, in the related art, two gate-on voltage modulation signals VGHM1 and VGHM2 are generated by using two clock signals FLK of different phases, and the gate-on voltage modulation signal VGHM1 is applied to the odd numbered line and the gate-on voltage modulation signal VGHM2 is applied to the even numbered line, to enable to output the gate modulation signal even in the overlapping driving.

As described, in order to embody the gate pulse modulation of the overlapping driving in the GIP liquid crystal display device, a plurality of clock signals FLK are required. That is, two flicker preventive signals FLK are required (See FIG. 1) for four phased driving, and three flicker preventive signals FLK are required for six phased driving.

That is, FIG. 4 illustrates a timing diagram for explaining a problem of the gate pulse modulation in a case only one flicker preventive signal FLK is used in the related art.

Referring to FIG. 4, in the case only one flicker preventive signal FLK is used, a dip takes place at the modulated gate output signals (GATE OUTPUT N) and (GATE OUTPUT N+1), making reliability of the driving of the liquid crystal display device poor.

Three flicker preventive signals FLK are required for six phased driving.

FIG. 5 illustrates a block diagram of a related art level shifter for the six phased driving.

FIG. 5 illustrates a case the gate pulse modulation unit is merged to the level shifter.

From the timing controller (not shown), three flicker preventive signals FLK1, FLK2 and FLK3 are forwarded to the gate pulse modulation unit GPM, and the gate high signals VGH1 and VGH2 and six clock signals GCLK1, GCLK2, GCLK3, GCLK4, GCLK5 and GCLK6 are forwarded to the level shifter L/S.

Since the timing controller is required to apply the three flicker preventive signals FLK1, FLK2 and FLK3 and the six clock signals GCLK1, GCLK2, GCLK3, GCLK4, GCLK5 and GCLK6 to the level shifter L/S, numbers of input/output pins of the timing controller and the level shifter are increased.

BRIEF SUMMARY

A circuit for driving a liquid crystal display device includes a liquid crystal panel having a plurality of pixel regions for displaying an image, a timing controller that generates one flicker preventive signal and a plurality of clock signals and gate control signals to control driving timing of a gate driver; a gate pulse modulation unit that logically operates the one flicker preventive signal and the plurality of clock signals from the timing controller to generate a plurality of flicker preventive signals, and modulating a gate high voltage from the timing controller according to each of the plurality of flicker preventive signals generated thus to generate a plurality of modulated gate on voltages; a level shifter unit that changes the plurality of clock signals from the timing controller according to the plurality of modulated gate on voltages from the gate pulse modulation unit and a gate low voltage from the timing controller to generate a plurality of level shifted and modulated clock signals; and a gate driver that drives gate lines on the liquid crystal panel according to the a plurality of level shifted and modulated clock signals.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION OF THE DRAWINGS AND THE PRESENTLY PREFERRED EMBODIMENTS

Reference will now be made in detail to the specific embodiments of the present invention, examples of which are illustrated in the accompanying drawings. Wherever possible, the same reference numbers will be used throughout the drawings to refer to the same or like parts.

Since the liquid crystal panel, the gate driver and the data driver of the present invention are identical to the same of the related art, detailed description of the same will be omitted, and the description of the present invention will be focused on a timing controller, a gate pulse modulation unit and a level shifter.

Figure 6:
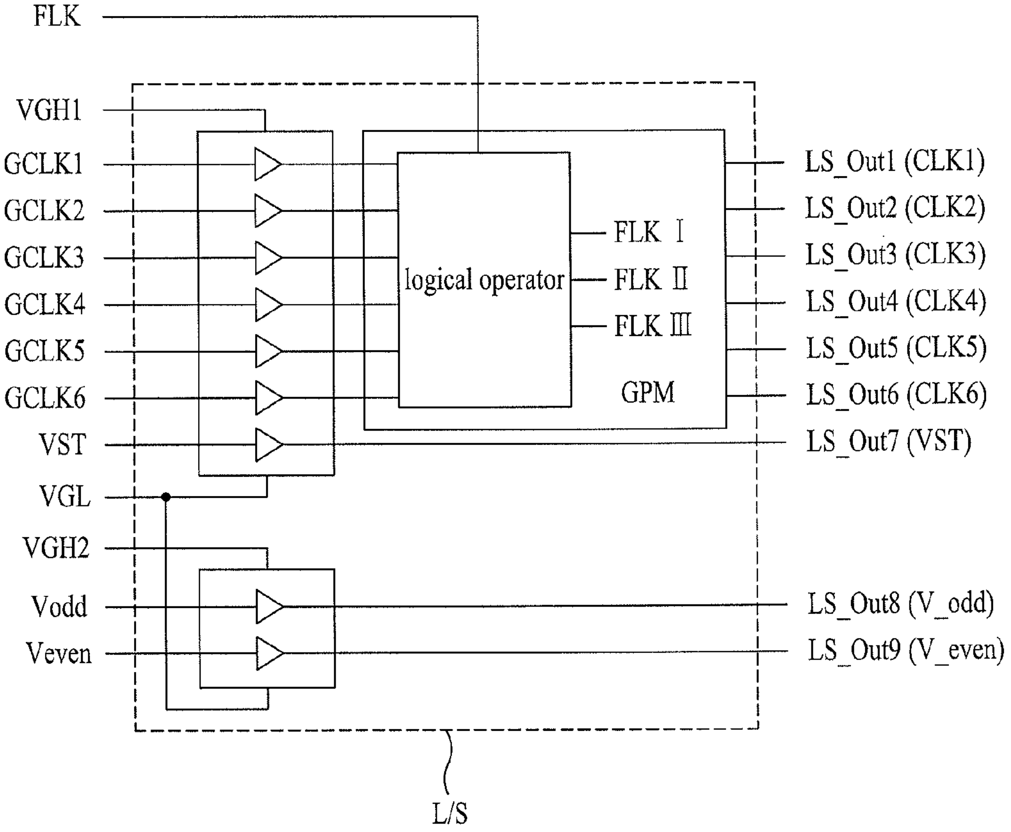
FIG. 6 illustrates a block diagram of a level shifter in a liquid crystal display device in accordance with an embodiment of the present invention.
Figure 7:
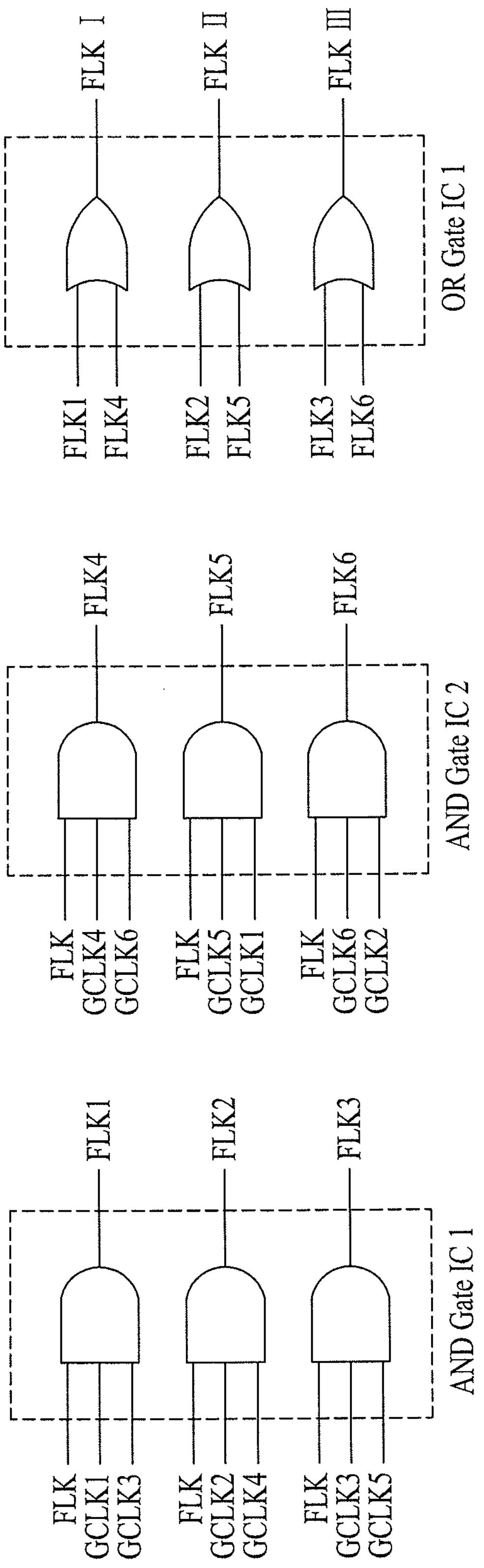
FIG. 7 illustrates details of logical operators in the gate pulse modulation unit GPM in FIG. 6.

FIG. 6 illustrates a block diagram of a driver (level shifter) of a liquid crystal display device in accordance with a preferred embodiment of the present invention, and FIG. 7 illustrates details of logical operators in the gate pulse modulation unit GPM in FIG. 6.

Alikely, FIG. 6 also illustrates a case the gate pulse modulation unit is merged to a level shifter for six phased driving.

That is, one flicker preventive signal FLK is forwarded to the gate pulse modulation unit GPM from the timing controller (not shown). The rest gate high voltages VGH1 and VGH2, the gate low voltage VGL and six clock signals GCLK1, GCLK2, GCLK3, GCLK4, GCLK5 and GCLK6 are forwarded to the level shifter L/S.

Thus, the gate pulse modulation unit GPM includes a logical operator for receiving the one flicker preventive signal FLK and the six clock signals GCLK1, GCLK2, GCLK3, GCLK4, GCLK5 and GCLK6 from the timing controller and subjecting the same to logical operation to generate three flicker preventive signals, additionally.

That is, referring to FIG. 7, the logical operator includes a first AND gate AND1 for receiving the one flicker preventive signal FLK and the first and third clock signals GCLK1 and GCLK3 from the timing controller and logically operating the same to generate an FLK1 signal, a second AND gate AND2 for receiving the one flicker preventive signal FLK and the second and fourth clock signals GCLK2 and GCLK4 from the timing controller and logically operating the same to generate an FLK2 signal, a third AND gate AND3 for receiving the one flicker preventive signal FLK and the third and fifth clock signals GCLK3 and GCLK5 from the timing controller and logically operating the same to generate an FLK3 signal, a fourth AND gate AND4 for receiving the one flicker preventive signal FLK and the fourth and sixth clock signals GCLK4 and GCLK6 from the timing controller and logically operating the same to generate an FLK4 signal, a fifth AND gate AND5 for receiving the one flicker preventive signal FLK and the first and fifth clock signals GCLK1 and GCLK5 from the timing controller and logically operating the same to generate an FLK5 signal, a sixth AND gate AND6 for receiving the flicker preventive signal FLK and the second and sixth clock signals GCLK2 and GCLK6 from the timing controller and logically operating the same to generate an FLK6 signal, a first OR gate OR1 for logically operating the signals FLK1 and FLK4 from the first AND gate AND1 and the fourth AND gate AND4 to generate a first flicker preventive signal FLK I, a second OR gate OR2 for logically operating the signals FLK2 and FLK5 from the second AND gate AND2 and the fifth AND gate AND5 to generate a second flicker preventive signal FLK II, and a third OR gate OR3 for logically operating the signals FLK3 and FLK6 from the third AND gate AND3 and the sixth AND gate AND6 to generate a third flicker preventive signal FLK III.

Though 6 phased driving is described with reference to FIGS. 6 and 7, it is apparent that, in a case of four phased driving, the clock signals are four, and the logical operator generates two flicker preventive signals.

The operation of the gate pulse modulation unit GPM of the present invention will be described.

Figure 8:
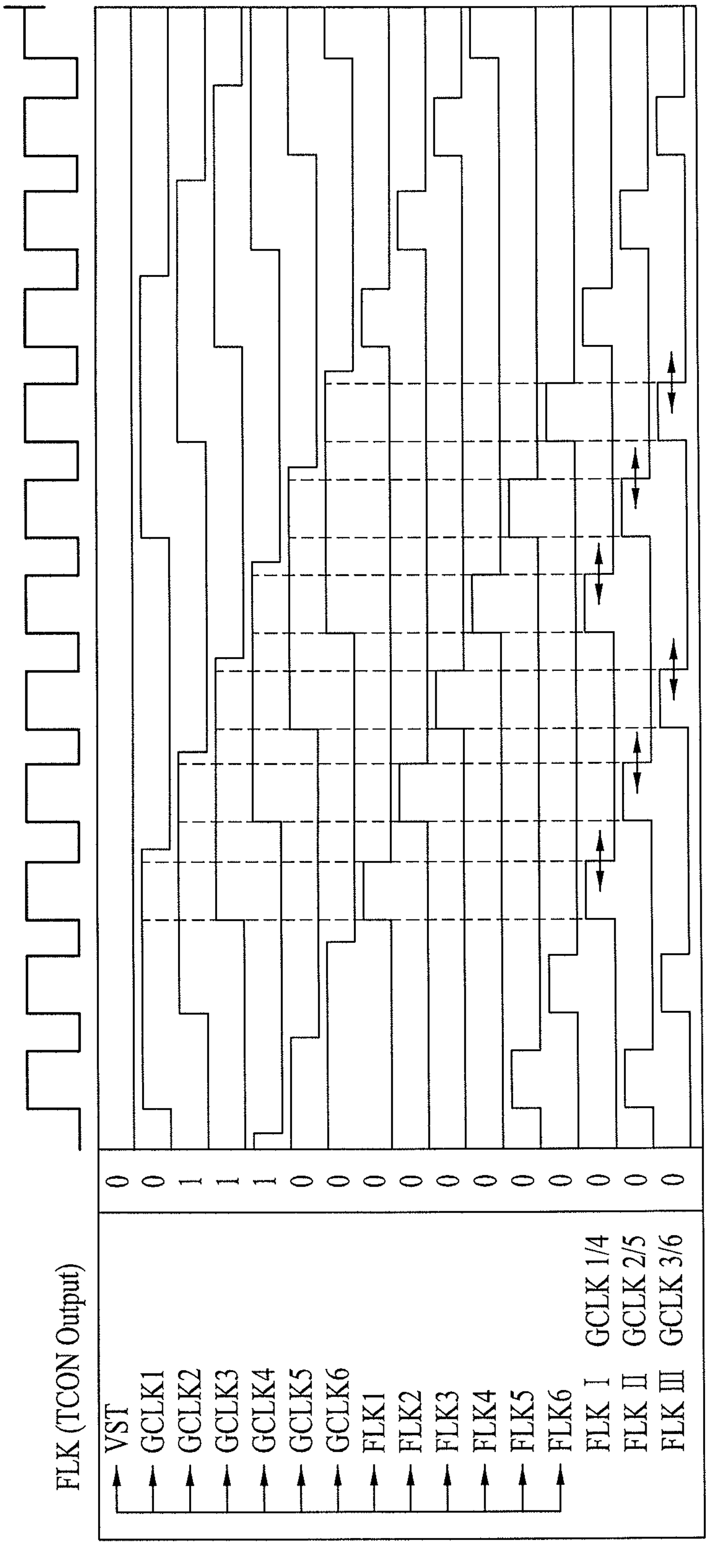
FIG. 8 illustrates a timing diagram of pulses of a level shifter having a gate pulse modulation unit GPM merged thereto in accordance with an embodiment of the present invention.

FIG. 8 illustrates a timing diagram of pulses of a level shifter having a gate pulse modulation unit GPM merged thereto in accordance with a preferred embodiment of the present invention.

The timing controller forwards the one flicker preventive signal FLK, a start pulse VST, the first to six clock signals GCLK1, GCLK2, GCLK3, GCLK4, GCLK5 and GCLK6, a gate high voltage VGH1 and VGH2, and a gate low voltage VGL, and the level shifter L/S receives the same.

The one flicker preventive signal FLK has a sinusoidal wave of fixed cycles, and the first to six clock signals overlap with one another, has shifted phases and forwarded in succession.

Accordingly, the logical operator in the gate pulse modulation unit GPM subjects the flicker preventive signal FLK, and the first to six clock signals GCLK1, GCLK2, GCLK3, GCLK4, GCLK5 and GCLK2 to logical production and logical sum, to generate first, second and third flicker preventive signals FLK I, FLK II and FLK III for the six phased driving.

The gate pulse modulation unit GPM receives the first, second and third flicker preventive signals FLK I, FLK II and FLK III generated thus and the gate high voltage VGH1, and generates modulated gate on voltages GPM1, GPM2 and GPM3.

Figure 1:
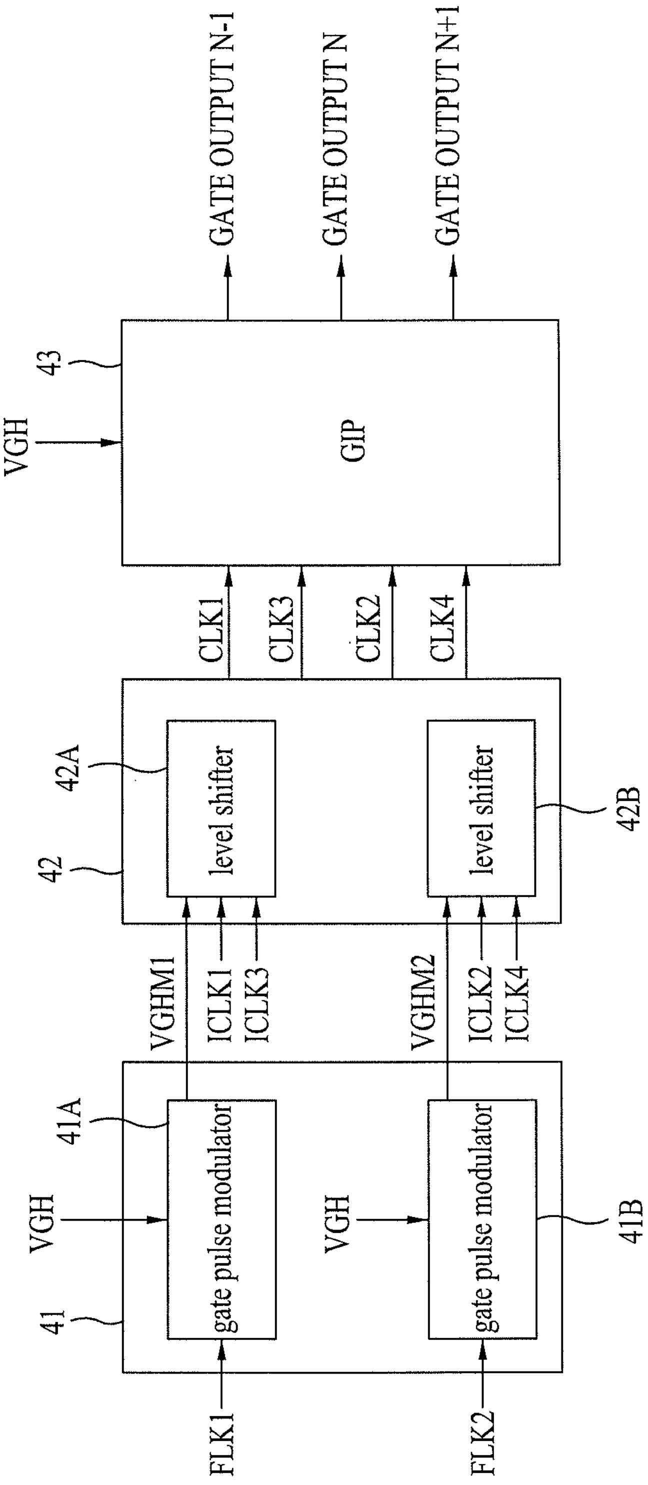
FIG. 1 prior art
FIG. 1 illustrates a block diagram of a related art gate pulse modulation signal generating circuit.
Figure 2:
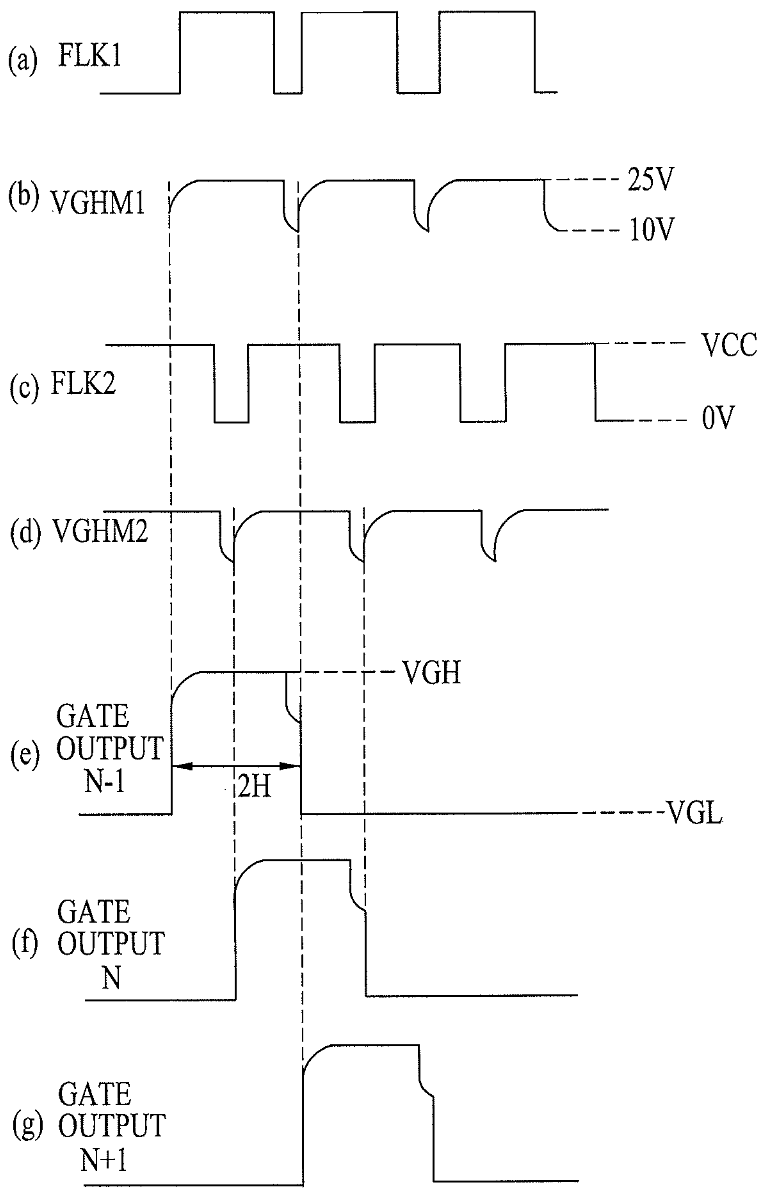
FIG. 2 prior art
FIGS. 2A~2G illustrate waveforms for showing generating steps of a gate pulse modulation signal in a related art overlapping drive.

That is, the modulated first gate on voltage GPM1 is generated by using the first flicker preventive signal FLK I, the modulated second gate on voltage GPM2 is generated by using the second flicker preventive signal FLK II, and the modulated third gate on voltage GPM3 is generated by using the third flicker preventive signal FLK III. That is, as shown in FIG. 2, the modulated gate on voltages are generated synchronized to the flicker preventive signals, respectively.

Figure 3:
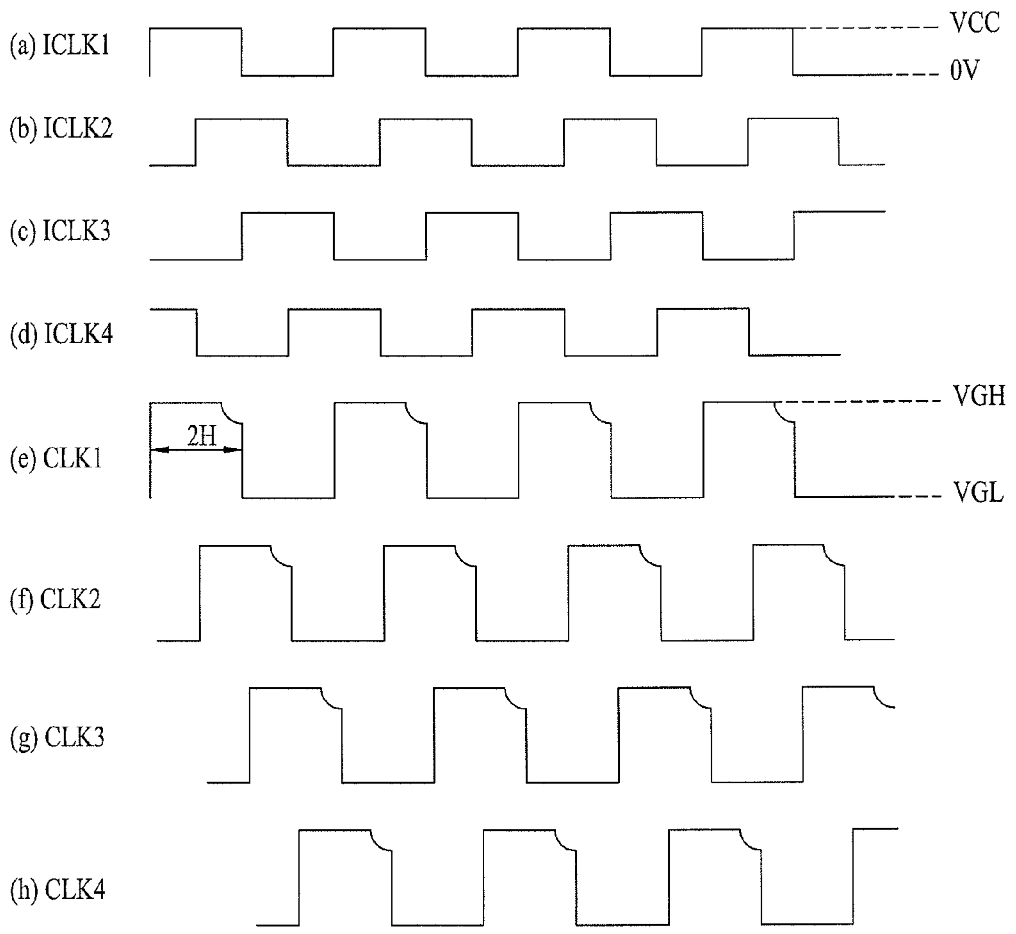
FIG. 3 prior art
FIGS. 3A~3D illustrate waveforms of related art clock signals respectively.
FIGS. 3E~3H illustrate waveforms of related art level shifted and modulated clock signals, respectively.
Figure 4:
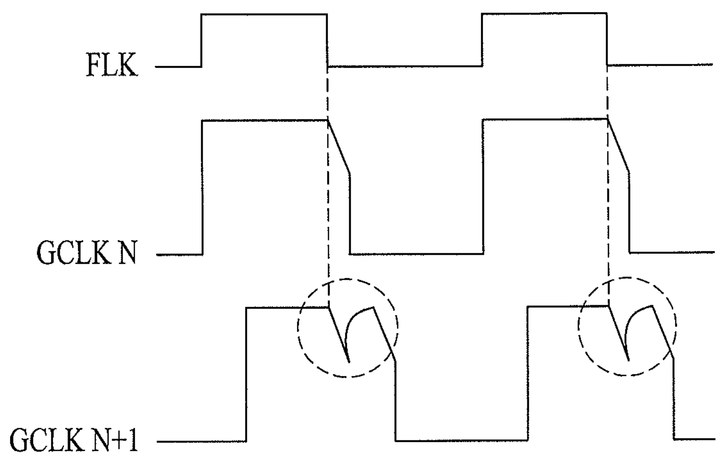
FIG. 4 prior art
FIG. 4 illustrates a timing diagram for explaining a problem of the gate pulse modulation in a case only one flicker preventive signal FLK is used in a related art.
Figure 5:
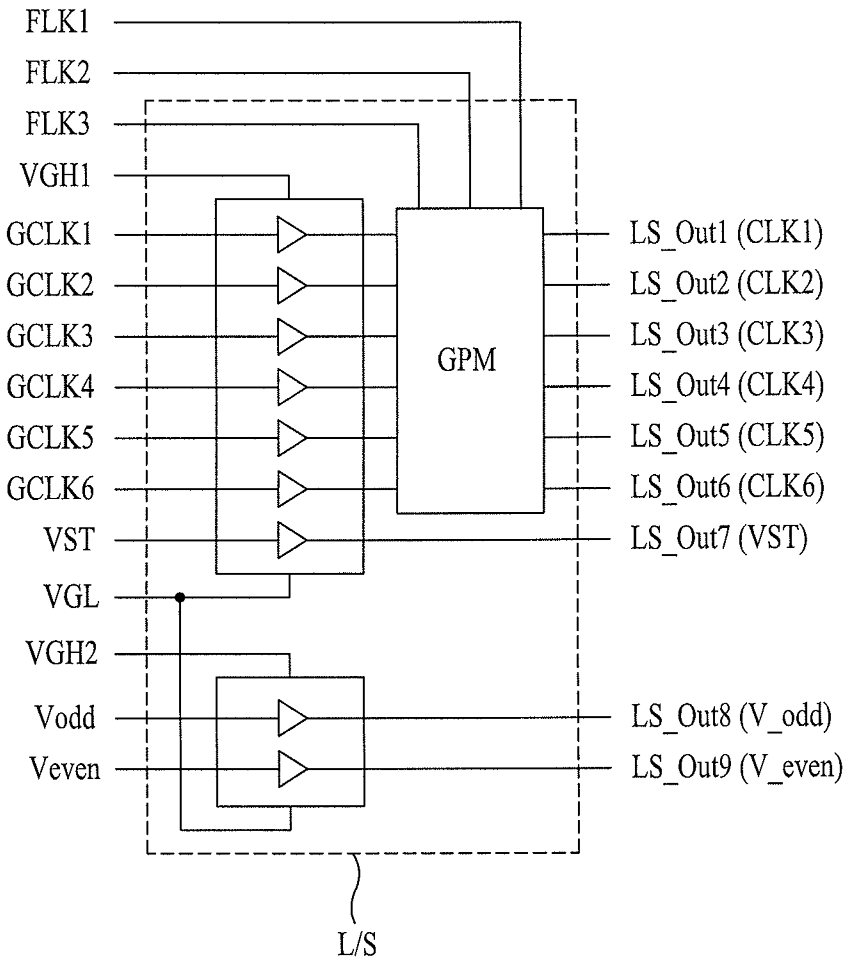
FIG. 5 prior art
FIG. 5 illustrates a block diagram of a related art level shifter for the six phased driving.

Then, the level shifter L/S receives the first gate on voltage modulated signal GHM1 from the gate pulse modulation unit GPM, the first and fourth clock signals GCLK1 and GCLK4 and the gate low voltage VGL from the timing controller (not shown) to generate level shifted and modulated first and fourth clock signals CLK1 and CLK4, receives the second gate on voltage modulated signal GHM2 from the gate pulse modulation unit GPM, the second and fifth clock signals GCLK2 and GCLK5 and the gate low voltage VGL from the timing controller (not shown) to generate level shifted and modulated second and fifth clock signals CLK2 and CLK5, and receives the third gate on voltage modulated signal GHM3 from the gate pulse modulation unit GPM, the third and sixth clock signals GCLK3 and GCLK6 and the gate low voltage VGL from the timing controller (not shown) to generate level shifted and modulated third and sixth clock signals CLK3 and CLK6 (See FIG. 3).

As has been described, the circuit for driving a liquid crystal display device of the present invention has the following advantages.

Since the gate pulse modulation unit GPM generates three flicker preventive signals upon reception of only one flicker preventive signal from the timing controller, permitting to drive a liquid crystal display device with four or six phased driving of gate pulse modulation unit GPM, numbers of the input/output pins of the timing controller and the level shifter (gate pulse modulation unit) can be reduced.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A circuit for driving a liquid crystal display device comprising:

a liquid crystal panel having a plurality of pixel regions that display an image;

a timing controller that generates one flicker preventive signal and a plurality of clock signals and gate control signals to control driving timing of a gate driver;

a gate pulse modulation unit that logically operates the one flicker preventive signal and the plurality of clock signals from the timing controller to generate a plurality of flicker preventive signals, and modulating a gate high voltage from the timing controller according to each of the plurality of flicker preventive signals generated thus to generate a plurality of modulated gate on voltages;

a level shifter unit that changes the plurality of clock signals from the timing controller according to the plurality of modulated gate on voltages from the gate pulse modulation unit and a gate low voltage from the timing controller to generate a plurality of level shifted and modulated clock signals; and a gate driver that drives gate lines on the liquid crystal panel according to the a plurality of level shifted and modulated clock signals.

2. The circuit as claimed in claim 1, wherein the gate pulse modulation unit includes a logical operator that, if it is a four phased driving, logically operates the one flicker preventive signal and four clock signals from the timing controller to generate two flicker preventive signals, or, if it is a six phased driving, logically operates the one flicker preventive signal and six clock signals from the timing controller to generate three flicker preventive signals.

3. The circuit as claimed in claim 2, wherein the logical operator includes;

a first AND gate that receives the one flicker preventive signal FLK and the first and third clock signals GCLK1 and GCLK3 from the timing controller and logically operates the same to generate an FLK1 signal, a second AND gate that receives the one flicker preventive signal FLK and the second and fourth clock signals GCLK2 and GCLK4 from the timing controller and logically operates the same to generate an FLK2 signal, a third AND gate that receives the one flicker preventive signal FLK and the third and fifth clock signals GCLK3 and GCLK5 from the timing controller and logically operates the same to generate an FLK3 signal, a fourth AND gate that receives the one flicker preventive signal FLK and the fourth and sixth clock signals GCLK4 and GCLK6 from the timing controller and logically operates the same to generate an FLK4 signal, a fifth AND gate that receives the one flicker preventive signal FLK and the first and fifth clock signals GCLK1 and GCLK5 from the timing controller and logically operates the same to generate an FLK5 signal, a sixth AND gate that receives the one flicker preventive signal FLK and the second and sixth clock signals GCLK2 and GCLK6 from the timing controller and logically operates the same to generate an FLK6 signal, a first OR gate that logically operates the signals FIK1 and FIK4 from the first AND gate and the fourth AND gate to forward a first flicker preventive signal FLK I, a second OR gate that logically operates the signals FIK2 and FIK5 from the second AND gate and the fifth AND gate to forward a second flicker preventive signal FLK II, and a third OR gate that logically operates the signals FIK3 and FIK6 from the third AND gate and the sixth AND gate to forward a third flicker preventive signal FLK III.

* * * * *